United States Patent [19]

Cowpland et al.

[11] 4,178,485
[45] Dec. 11, 1979

[54] TRANSFORMERLESS TELEPHONE LINE CIRCUIT

[75] Inventors: Michael C. J. Cowpland, Ottawa; Patrick R. Beirne, Stittsville, both of Canada

[73] Assignee: Mitel Corporation of Kanata, Ontario, Canada

[21] Appl. No.: 906,772

[22] Filed: May 17, 1978

[30] Foreign Application Priority Data

Feb. 1, 1978 [CA] Canada ................................. 296137

[51] Int. Cl.² ............................................. H04Q 3/18
[52] U.S. Cl. ................................................ 179/18 FA
[58] Field of Search ..................... 179/18 FA, 16 EC; 330/147, 260, 116

[56] References Cited

U.S. PATENT DOCUMENTS

| | | | |
|---|---|---|---|
| 4,007,335 | 2/1977 | Hetherington et al. | 179/18 FA X |
| 4,020,294 | 4/1977 | Kitajewski et al. | 179/18 FA |

Primary Examiner—William C. Cooper
Attorney, Agent, or Firm—Craig and Antonelli

[57] ABSTRACT

A transformerless bidirectional amplifier useful in a balanced two wire to single wire line circuit, which blocks common mode signals and allows full control of signal levels, impedances, etc. A differential amplifier circuit is connected to the balanced wires, and has its output connected through a buffer amplifier to a single unbalanced wire. A second differential amplifier has its respective input terminals connected to the input and output of the buffer amplifier. The output of the second differential amplifier is connected to one of the balanced wires, and through a resistor to one of the inputs of the first differential amplifier which is connected to the other of the two balanced wires. The value of the latter resistor is such as to apply sufficient output signal from the second differential amplifier to the first differential amplifier so as to cancel a signal from the second differential amplifier which is applied to the first differential amplifier via the first wire of the balanced pair. The second differential amplifier exhibits different gains for the respective two signals applied to its individual inputs which are from the output of the first differential amplifier, whereby they are cancelled.

13 Claims, 3 Drawing Figures

TRANSFORMERLESS TELEPHONE LINE CIRCUIT

This invention relates to a transformerless bidirectional balanced two wire to single wire line circuit which is usefully employed in a PBX.

Line circuits which are used, for example in a PBX provide a facility for feeding direct current via a subscriber's line to the local telephone sets to which they are connected, and as well are required to block common mode signals while transmitting voice frequency signals in both directions. Common mode signals often arise as a result of the subscriber's lines passing close to a source of interference, such as house or building wiring which carries 60 Hz mains current. The voice frequency signals which are otherwise carried by the telephone lines are often found deeply modulated by the interfering common mode signals. Slight imbalance between the tip and ring leads of a long line would thus result in the common mode signal frequencies being differentially received. It is therefore important to stop the transmission of common mode signals within the line circuit.

Common mode signals are usually stopped by the use of a transformer in the line circuit. The tip and ring leads are connected to carefully balanced opposingly wound windings, which cancel the common mode signals. Since voice signals to be transmitted are differential in nature with respect to the tip and ring leads, these signals do not cancel and as a result are induced in the secondary winding and are applied to further switching or other circuitry.

However, since direct current must be fed to the local subscriber's telephone set, it is normally passed through the windings of the line circuit transformer. This direct current tends to saturate the transformer, requiring a relatively heavy core which does not saturate at normal line currents.

It is also highly desirable to apply ringing current to the local subscriber's line from the line circuit, and to be able to sense the state of the subscriber's telephone set should the telephone set go off hook.

For use particularly with an electronic PBX which uses single wire switching (that is, one wire connected to common ground and one wire actually switched), it is necessary to convert the balanced subscribers line into an unbalanced line inexpensively for single wire switching, while at the same time raising the amplitude of a received signal from other telephone sets to a level required by the local subscribers telephone set. It is also preferable to be able to change the output signal levels at will in order that the switched signal levels might be equalized in the case of a conference call controlled by the PBX.

The invention described in U.S. Pat. No. 4,007,335 dated Feb. 8, 1977, assigned to Bell Telephone Laboratories, utilizes an integrated circuit which is connected between the tip and ring leads and is intended to reduce common mode signals. This circuit exhibits a high impedance to differential voice signals appearing on the tip and ring leads, and exhibits a low impedance between the tip and ring leads and ground for common mode interference signals. While the described circuit would operate satisfactorily for the application to which it is intended, by its nature it cannot transform a balanced line to an unbalanced line (which otherwise would be done by a transformer circuit). Accordingly it cannot be used in a two wire switching network, unless a following transformer is added.

Further, there is no facility for sensing the direct current level in the subscriber's line for determining the on or off hook status thereof. There is further no facility for changing the signal levels applied to the switching matrix. Neither is there a facility for applying ringing current to the subscribers line nor for cutting it off when the subscriber has gone off hook.

The present invention, on the other hand, is a circuit which is comprised of a two to one wire bidirectional amplifier. The present circuit transforms a balanced tip and ring circuit to an unbalanced line, and at the same time transforms an unbalanced line to a balanced lead pair. Accordingly it can be used to feed a single wire switching matrix directly without requiring an additional transformer. The bidirectional amplifier performs without introducing positive feedback or undesired sidetone. At the same time the circuit substantially blocks common mode signals which may appear on the balanced pair from being transfered to the unbalanced output line.

The circuit also provides means for increasing the amplitude of the outgoing signal to the unbalanced line in order that the reduced impedance, which may appear from the line to common ground due to the connection thereacross of a plurality of conferencing telephone sets which would otherwise result in a reduction in signal amplitude, is compensated for.

At the same time, the circuit provides means for detecting the on or off hook status of the subscribers line, for applying ringing to the subscribers line, and for causing ringing to be cut off upon the local subscriber's telephone set going off hook.

The advantages of the invention are obtained by the provision of a telephone line circuit comprising balanced tip and ring leads for connection to a telephone set, and an unbalanced line output lead, first differential amplifier means having its input terminals connected through individual equal valued resistor means to the tip and ring leads, the values of each of the resistor means being at least 10 times the offhook impedance of the telephone set, a buffer amplifier having its input connected by a first circuit path to the output of the first differential amplifier means and its output connected by a second circuit path to a line output lead, and second differential amplifier means having its input terminals connected respectively by circuit paths to the first and second circuit paths. The output of the second differential amplifier means is connected to one of the tip and ring leads and is also connected by a further resistor means to the other input of the first differential amplifier means which is connected to the other of the tip or ring leads. The value of the further resistor means is selected to apply sufficient output signal from the second differential amplifier means to the input of the first differential amplifier means which is connected to said other of the tip or ring leads such as to substantially cancel a signal within the first differential amplifier means which is applied to its input terminals via the one of the tip or ring leads from the output of the second differential amplifier means.

It is preferred that the first differential amplifier means should have a gain of less than one, and that the buffer amplifier should have a gain of about the reciprocal of the gain of the first differential amplifier means. It is also preferred that the second differential amplifier means should be comprised of amplifying means having gain which is different for different signals applied to each of its inputs from the first circuit path and from the second circuit path respectively. The gains are selected so as to translate the individual signals applied from the output of the first differential amplifier means to each of the inputs of the second differential amplifier means to amplitude levels which are substantially equal whereby substantially cancel within the second differential amplifier means.

A better understanding of the invention will be obtained by reference to the detailed description below, and to the following drawings, in which.

Figure 1:
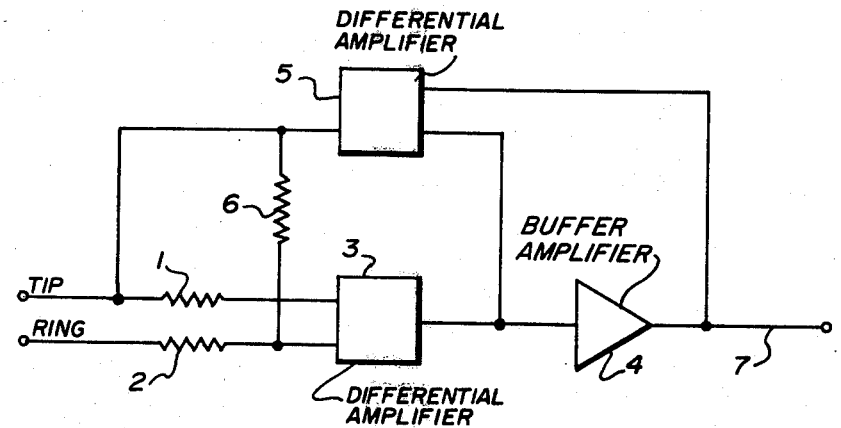
FIG. 1 is a block schematic of the most general form of the invention.

Turning first to FIG. 1, a general block schematic of the invention is shown. A balanced line comprising tip and ring lead is connected via equal valued resistors 1 and 2 to differential amplifier means 3. The output of differential amplifier means 3 is connected to the input of a buffer amplifier 4 and to the non-inverting input of a differential amplifier means 5. The output of differential amplifier means 5 is connected to one of either the tip or ring leads (shown here as the tip lead), and through a resistor 6 to the input of differential amplifier means 3 to which the other of the tip and ring leads is connected through one of the aforenoted equal valued resistors. Unbalanced line output 7 is connected to the output of buffer amplifier 4, and is also connected to the inverting input of differential amplifier means 5.

In operation, a subscriber's telephone set will be connected between the tip and ring leads. Signals are generated thereby, and appear as a differential signal across the tip and ring leads. Differential amplifier means 3 therefore translates the signal, and converts it at the same time to an unbalanced output signal between its output and ground. This signal is applied to buffer amplifier 4 which applies it to the unbalanced line output 7.

Common mode interference signals appearing on the tip and ring leads, however, are in phase on both leads with respect to ground, and are applied with equal amplitude and phase to the inputs of differential amplifier means 3. Accordingly since there is no difference between the signals across the input of the amplifier means, the signals are not amplified and do not appear at the output of differential amplifier means 3.

Accordingly the circuit so far described amplifies voice frequency signals in one direction, while changing the balanced subscriber's line into an unbalanced line output. At the same time common mode signals are stopped.

As noted earlier, however, the inventive circuit is a bidirectional amplifier, and also includes means for amplifying signals arriving from the unbalanced line and translating them into signals applied to the balanced line. Differential amplifier means 5 has a non-inverting input connected to the first circuit path between the output of differential amplifier means 3 and the input of buffer amplifier 4. The inverting input of differential amplifier means 5 is connected to the second circuit path from the output of buffer amplifier 4 to unbalanced line output 7.

The signal arriving from the line output 7 is thus applied for amplification to differential amplifier means 5. However this signal would also include a signal arising from the first described tip and ring leads as amplified and passed through differential amplifier 3 and buffer amplifier 4. The signal from the output of differential amplifier means 3 is applied to both inputs of differential amplifier means 5 in such manner that, with the respective gains of amplifier means 5 applied to the signals from the respective inputs, the signals from differential amplifier 5 are caused to cancel, and are not reapplied from the output of differential amplifier 5 back to the tip and ring leads. Accordingly positive feedback, excessive side tone or the like is avoided. The manner in which the specific cancellation occurs will be described in more detail in conjunction with FIG. 2.

It should be noted that buffer amplifier 4 should therefore be of the non-inverting type, for the polarity of the tip and ring signal as applied to differential amplifier means 5 to be correct. Furthermore, buffer amplifier 4 functions as an isolator, restricting signals arriving from line output 7 from being applied to the non-inverting input of differential amplifier 5. Accordingly signals arriving from line output 7 are differentially applied to differential amplifier means 5 and are thus amplified and applied to the tip lead.

It will be understood that the signal applied to the tip lead is as a result also applied as a differential signal to the input of differential amplifier 3. Resistors 1 and 2 which are connected in series with the respective tip and ring leads and the inputs of differential amplifier means 3 should be of high resistance, each preferably at least 100 times the offhook impedance of the telephone set. This reduces the differential signal level appearing at the input of differential amplifier means 3 from the output of differential amplifier means 5 (the signal arriving from the line output) by at least 200 times.

This lower amplitude signal is cancelled by the application of signal from the output of differential amplifier 5 via resistor 6 to the other input of differential amplifier 3. Resistor 6 should therefore be at least 200 times the off-hook impedance of the telephone set, and should be of value such as to apply the exact amount of signal to the differential amplifier 3 to cancel the residual reduced signal appearing thereat from the output of differential amplifier means 5.

Accordingly signals appearing on the unbalanced line 7 are applied to the balanced the tip and ring leads, with virtually no sidetone feedback to the line.

To inhibit the formation of unbalanced currents, it is preferred that resistors 1 and 2 each should have tolerance within 0.1%.

Figure 2:
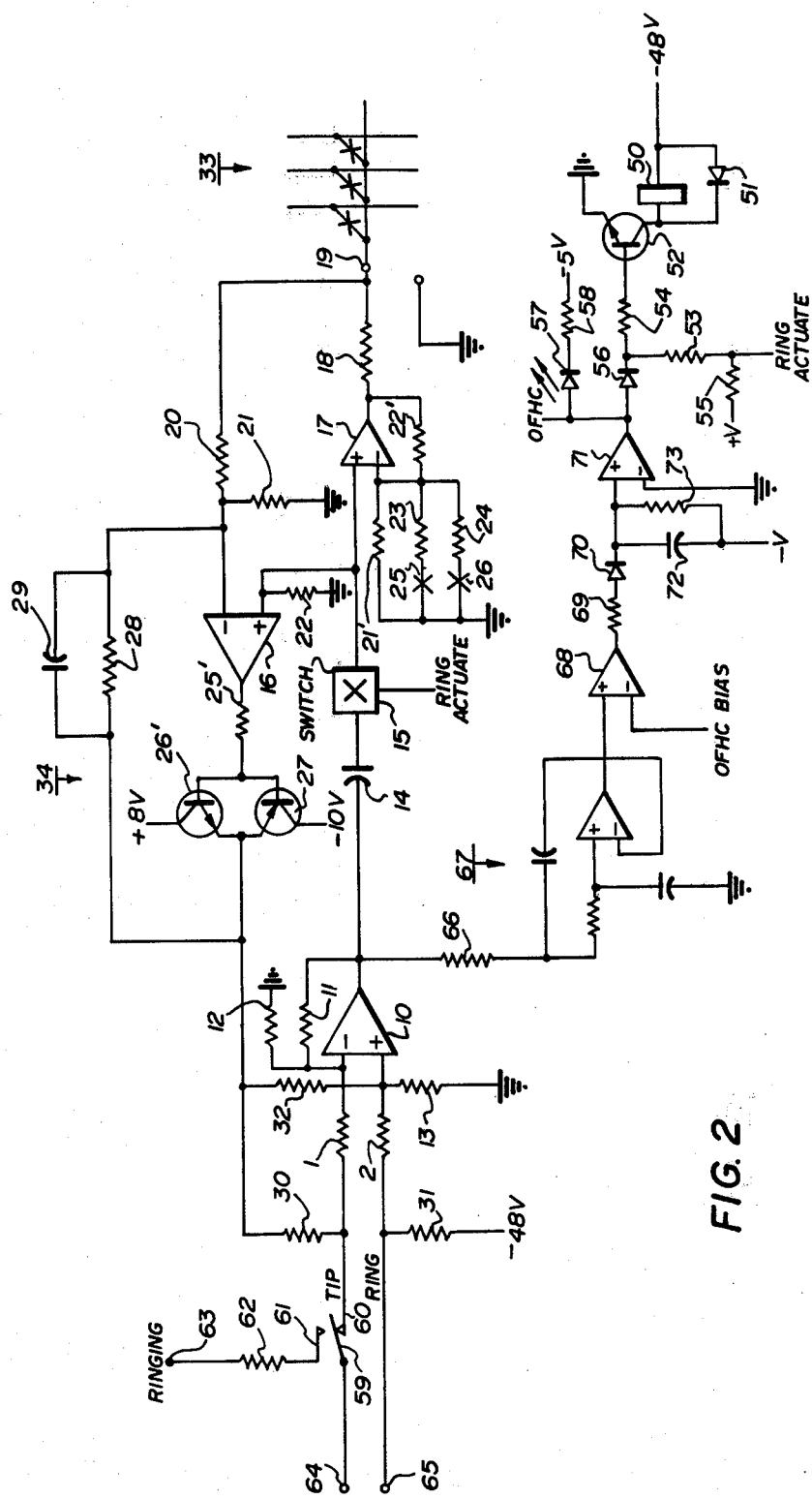
FIG. 2 is a detailed schematic of the invention.

FIG. 2 is a schematic diagram showing the inventive telephone line circuit in detail. The tip and ring leads are connected through resistors 1 and 2 to the respective input terminals of differential operational amplifier 10. The operational amplifier has a feedback resistor 11 connected between its output and its inverting input in the conventional manner. As noted with respect to FIG. 1, resistors 1 and 2 should each be preferably at least 100 times the impedance of the off-hook telephone set which is to be connected to the tip and ring leads (although it could in come circumstances and special designs, be less). Resistors 12 and 13 connect the inverting and the noninverting input terminals of operational amplifier 10 to ground.

The output of operational amplifier 10 is connected through a DC blocking capacitor 14 to the input of a switch 15. Preferably switch 15 is an externally enabled CMOS switch.

The output of switch 15 is connected both to the non-inverting input of a second differential amplifier 16 and to the noninverting input of a third differential amplifier 17, (which corresponds to buffer amplifier 4). The output of third differential amplifier 17 is connected through resistor 18 to the line output terminal 19.

Line output terminal 19 is connected through resistor 20 to the inverting input of second differential amplifier 16. The inverting and noninverting inputs thereof are connected through respective resistors 21 and 22 to ground.

It is preferred that resistor 18 be of similar impedance as the line which is connected to line output terminal 19, for matching purposes, since the output impedance of differential amplifier 17 would otherwise by very low.

The inverting input of third differential amplifier 17 is connected to ground through resistor 21', and is also connected via a feedback resistor 22 to the output of differential amplifier 17.

The inverting input of third differential amplifier 17 is also connected through individual resistors 23 and 24 in series with make contacts 25 and 26 to ground. Accordingly should either contacts 25 or 26 be closed, resistors 23 or 24 are connected in parallel with resistor 21'. Since the gain of amplifier 17 for signals applied to the non-inverting input is determined by the ratio of the value of resistors 22' to 21', the gain of this stage can be effectively changed by connecting either resistor 23 or resistor 24 in parallel with resistor 21'. Switches 25 and 26 are closed by an externally operated switching matrix, not shown.

The output of second differential amplifier 16 is connected through a low valued resistor of approximately line impedance to the input of a power amplifier stage comprising transistors 26' and 27. The bases of NPN transistor 26' and PNP transistor 27 are connected together to resistor 25. The collector of transistor 26' should be connected to a positive source of direct current, such as +8 V, and the collector of transistor 27 should be connected to a source of negative potential, such as −10 V. The emitters are connected together, and clearly are at close to 0 volts DC.

The emitters of transistors 26' and 27 are connected through resistor 28 to the inverting input of differential amplifier 16, which resistor is bypassed by a small high frequency rolloff capacitor 29.

The operation of differential amplifier 16 with resistor 25 and transistors 26' and 27 as well as feedback resistor 28 is similar to a differential amplifier with a normally connected feedback loop, but having a high current capacity output stage. The output stage is required to feed line current to the tip and ring leads as will be described below.

The emitters of transistors 26' and 27 are connected through a resistor 30 to the tip lead, and the ring lead is connected through a resistor 31 to a source of potential such as −48 volts.

As was described with respect to resistor 6 in FIG. 1, the emitters of transistors 26' and 27 are connected through resistor 32 to the non-inverting input of operational amplifier 10.

Resistors 30 and 31 should each have the value of ½ the tip and ring line impedance, the latter being approximately the value of the off-hook telephone station set impedance. It is important that resistors 30 and 31 should be very closely matched in value, for instance to 0.1%.

Further, resistors 12 and 32 should be also as closely matched in value, and should be at least twice the value of resistors 1 and 2, and should be at least 10 times the line impedance, i.e. 10 times the impedance of the off-hook telephone set. Resistor 13 should be the same value as resistor 11, with the aforenoted 0.1% tolerance, for the purpose of ensuring that the tip and ring leads are not subjected to imbalance.

In operation, a subscriber's telephone set is assumed to go off-hook. Battery voltage is supplied through transistors 26' and 27 to the tip lead through resistor 30, and passes through the telephone set the ring lead, and through resistor 31 to the other terminal of the battery supply, −48 volts. It is important that the battery feed circuit appear as a low impedance voltage source.

The ratio of the sum of the resistances of resistors 1 and 2 to the line impedance provides a voltage division of any common mode signals which may appear on the tip and ring leads, as applied to amplifier 10. While equal valued common mode signals being applied to the input terminals of differential amplifier 10 would cancel in any event, it is preferred to reduce their amplitude in case there is a differential interference component modulated on the common mode signals, and in the case of differences in the values of resistors 1 and 2, which would give rise to a differential component.

It is preferred that the amplification of the circuit which includes differential amplifier 10 should be about 1/10. Accordingly if resistor 1 is 100,000 ohms for instance, resistor 11 should be about 10,000 ohms.

Differential voice frequency signals are also subjected to a reduction in amplitude of 1/10. These signals are applied through capacitor 14, through switch 15, to the non-inverting input of differential amplifier 16. They are also passed through buffer 17, resistor 18 and resistor 20 to the inverting input of differential amplifier 16. The ratio of resistors 22 to 21 preferably is 10 to 1, which provides an amplification of 10 of the voice signals applied to buffer amplifier 17. This compensates completely for the signal loss in the circuit of amplifier 10, and the original differential voice signal amplitude is restored.

However, resistor 18, as was noted earlier, should have a similar impedance as the unbalanced line at line output terminal 19, and accordingly the output signal at terminal 19 is ½ the input voice frequency signal across the tip and ring leads.

The signal at output line terminal 19 is applied to a crosspoint matrix 33, and is thus connected through the PBX to a similar terminal 19 of another line circuit of similar structure. The line level of a signal at the line terminal 19 arriving from another line circuit is therefore at ½ the tip and ring signal amplitude level. Both the signal from the local tip and ring leads passing through buffer amplifier 17 and the incoming signal are applied through resistor 20 to the inverting input of differential amplifier 16.

It should be noted that in the expressions to be given below with respect to gain, the entire circuit including output transistors 26' and 27 as well as resistor 25 and differential amplifier 16, and their accompaning directly connected resistors including feedback resistor 28 are considered as a single amplifier circuit 34.

Amplifier 34 has been designed to amplify different signals with different predetermined amounts of gain. An example of its operation will be given using typical values for the associated resistors. As an easily calculated example, resistor 20 can be 40.2K ohms, resistor 21 can be 9.53K ohms, and resistor 28 can be 200K ohms.

Accordingly, for signals appearing at the non-inverting input of amplifier 34 which arrived from the output of differential amplifier 10, the gain of the stage is the ratio of the value of resistor 28 to resistors 20 and 21 in parallel (since resistor 20 is connected to the line input, which is at relatively low impedance to ground, typically 600 ohms). For the example shown, the gain is $$200K / \frac{9.53K \times 40.2K}{(9.43K + 40.2K)}$$

which equals approximately twenty-six (non-inverting).

For signals arrived from the line terminal 19, the gain of the stage is the ratio of resistors 28 and 20. Accordingly the gain in this case is 200K/40.2K which equals approximately 5 (inverting).

As was noted earlier, the emitters of transistors 26' and 27 are connected through resistor 30 to the tip lead, the ring lead being connected through resistor 31 to effective AC ground (but which resistor in reality forms the DC line feed). The impedance between the tip and ring lead with the subscriber's telephone set off-hook is assumed to be 600 ohms, and the resistors 30 and 31 should be 300 ohms each.

Accordingly for a voice frequency signal on the tip and ring leads applied to differential amplifier 10, there will be a 10 times reduction at its output, and the output signal will be 1/10 the input signal. This is the signal which is applied to the non-inverting input of amplifier 16.

The signal is further amplified 10 times by the circuit of differential amplifier 17, re-establishing the original level at the output of the latter differential amplifier. However due to matching resistor 18 to the line impedance at output terminal 19, the output signal level at output terminal 19 is ½ the original signal level.

This signal is applied to the inverting input of differential amplifier 16. However due to the aforenoted difference in gain by amplifier circuit 34 to the signals applied to its non-inverting and inverting inputs, the 1/10 original signal level is multiplied by about twenty-six to provide an internally processed signal level of about 2.6 the original signal, while the signal applied to the inverting input is multiplied by −5, for an internal signal level of −5/2 or −2.5. The differential amplifier compares the two signals of +2.6 and −2.5, and provides an output signal of 0.1 times the input signal, wiich is virtually negligible, but which may be desireable in some instances to avoid the appearance of a "dead" line.

Clearly a selection of the values of resistors 20, 21 and 28, as well as resistors 22' and 21' (establishing the gain of differential amplifier 17), or by providing one or more trimmer resistors, an exact cancellation of any signal from the tip and ring leads from feeding back through differential amplifier 16 can be effected.

Considering now a signal arriving at line terminal 19 from the switching matrix 33, this is applied at half the original source level to amplifier 34. However due to the undirectional nature of buffer amplifier 17, it is restricted from being applied to the non-inverting input of differential amplifier 16. Amplifier circuit 34 increases the amplitude of the signal by the gain established by the ratio of resistors 28/20, noted earlier as −5. The output signal of amplifier circuit 34 is thus −5 times the half level input signal, or −2.5 times the input signal. This is applied through resistor 30 to the tip lead. Due to the voltage dividing action of resistors 30 and 31, there is a gain reduction, for the resistor values given, of ½ of signal amplitude, and the signal level applied to the tip and ring leads are about 2.5/2 times the original signal level, or 1.25 times the original signal level, which is slightly but negligibly greater than the original. Clearly an increase in the value of resistors 30 and 31 (i.e., to 350 ohms, for example) will cause the signal level applied to the tip and ring leads to be equal to the original signal, should the slightly increased level obtained as a result of use of the values given by example, be objectionable.

As was noted earlier, the signal applied from amplifier 34 via resistor 30 to the tip lead also appears at the inverting input of differential amplifier 10, reduced in amplitude by resistors 1 and 2, which signal would be translated by differential amplifier circuit 10 as a normal differential signal. Accordingly resistor 32 of at least twice the resistance of the total of resistors 1 and 2 carries the output signal of amplifier circuit 34 to the non-inverting input of differential amplifier 10. This signal provides an equal amplitude signal to the non-inverting input as appears on the inverting input, in order that exact cancellation of the signal output of amplifier 34 should be obtained at the input of differential amplifier 10, to avoid feedback and sidetone which would otherwise be reapplied back to line output terminal 19.

In case the switching matrix 33 has connected a number of subscribers lines together in a conference call, the impedance of the line at terminal 19 will be less than originally contemplated, i.e. less than 600 ohms, for instance. The output signal voltage level will then be less than that for a two party call. For a conference call, one or both of switches 25 or 26 are closed by external means, causing resistor 23 and/or 24 to be connected in parallel with resistor 21'. The gain of buffer amplifier 17 is thus increased increasing the output signal level to terminal 19 to the two-party call level. Compensation can thus be made for a conference call with a few or a great many participants.

Accordingly a bidirectional amplifier is provided, with a battery line feed and a translation of a balanced line to an unbalanced line. The signal levels are completely controlled and the facility provides selectable signal level compensation for conference calls.

Figure 3:
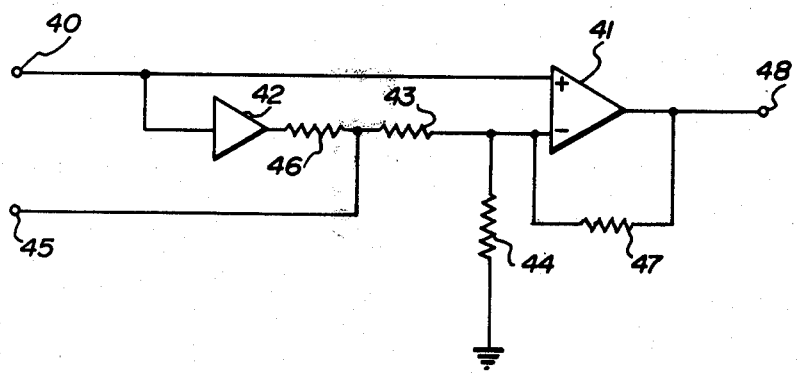
FIG. 3 is a detailed schematic of a dual gain amplifier used in the invention.

Before describing the remainder of the circuit in detail, reference is made to FIG. 3, which shows more generally the amplifier circuit which provides two levels of gain for two different input signals. A first signal source 40 is connected to the non-inverting input of a differential operational amplifier 41. The same signal source is also connected through a buffer amplifier 42, and through an input resistor 43 to the inverting input of differential amplifier 41. The same inverting input is connected to ground through resistor 44. Since the output impedance of buffer amplifier 42 is virtually zero, resistor 46 is connected in series.

A second signal source 45 is connected to resistor 43 in the signal path between the output of buffer amplifier 42 and resistor 43 where the latter resistor joins resistor 46. The second signal source 45 is at external line impedance. Resistor 46 should be of such value as to match the line impedance which typically might be 600 or 900 ohms. A feedback resistor 47 is connected between the output terminal 48 of the operational amplifier and the inverting input.

It will be seen that a signal received from source 40 is applied to the non-inverting input of amplifier 41 as well as to the inverting input, the latter through buffer amplifier 42 and resistors 46 and 43. Signals from source 45 are applied only to the inverting input of amplifier 41, and are blocked from being applied to the non-inverting input due to unidirectional buffer amplifier 42.

The gain of this amplifier for signals from source 40 is given by the expression $$R47 / \frac{(R44 \times R43)}{(R44 + R43)},$$

where each of the parameters is the resistance of the numerically identified resistor, in ohms.

On the other hand, the gain for signals from source 45, (assuming R46 is of a low resistance relative to resistors R43 and R47) is R47/R43.

It should be noted that should signal source 45 not be of low impedance relative to resistor 43, its impedance should be added to resistors 43 as an internal part thereof for the gain calculation.

As an example, assume resistor 46 is of low impedance, for instance 600 ohms resistor 43 is 50K ohms, resistor 44 is 10K ohms and resistor 47 is 250K ohms. Assume also that two different signals, each of 1 volt amplitude appear at sources 40 and 45.

The gain of this stage for the signal at source 45 will be 250K/50K or 5, and the amplitude of the output signal from source to will be $-5 \times 1.0 = -5.0$ volts. Since the signal had been AC, the 50 volt output signal, has its phase inverted 180 degrees from the input signal.

On the other hand the signal from source 40 is applied to the circuit and has a gain of $$250K / \frac{(50K \times 10K)}{60} = 30.$$

The output signal amplitude therefore is $30 \times 1.0 = 30$ volts.

The above is dependant, of course, on the power supply used for the amplifier (not shown) being sufficient to allow the voltage levels noted to be obtained. Nevertheless it is exemplary of a circuit which can equalize different signal levels, or can amplify, in one stage, two different signals to different degrees. Indeed, should various ones of the resistors be made variable, i.e., by means of a signal variable resistor such as a field effect transistor, an optical isolator, or the like, one or both of the input signals can be subjected to various gain modifications or can be modulated at will from an outside source. Interaction or various degrees of addition of the two input signals can thus be readily obtained.

Returning now to FIG. 2, it had been noted earlier that the circuit contains means for applying ringing voltage to the subscriber's line. A ringing relay 50 has the usual back EMF protection diode 51 connected thereacross. It is connected to a source of voltage —48V and to the collector of a PNP transistor 52, which itself has its emitter connected to ground.

A source of ring actuate signal is applied from a ring actuate lead through resistors 53 and 54 to the base of transistor 52, while a source of potential +V is connected through resistor 55 to the ring actuate lead as bias for transistor 52.

A signal is applied to the OFHK lead for the provision of remote ringing shut off. The OFHK lead is connected via diode 56 through resistor 54 to the base of transistor 52.

In operation, a source of low potential is applied to the ring actuate lead. This drops the potential level at the base, and causes operation of transistor 52, which conducts and operates ringing relay 50.

In the meantime the OFHK lead has a source of low potential amplified, and diode 56 is back biased. In the event of an indication of the local subscriber going off-hook, from a remote circuit (not shown), the level on OFHK lead changes and carries a high potential, causing diode 56 to conduct, raising the level at the junction of resistors 53 and 54 and thus the base of transistor 52, to high potential. Transistor 52 accordingly ceased conduction, open circuiting the current path through ringing relay 50, which is shut off.

It is preferred to connect a light emitting diode 57 through resistor 58 to a negative source of potential and to the OFHK lead. Accordingly when high level potential appears on the OFHK lead causing shutoff of ringing relay 50, light emitting diode 57 operates, providing a visual indication to an operator or serviceman that the circuit has functioned.

Ringing relay 50 is comprised of a single pole double throw set of contacts, having a moving pole contact 59, a break contact 60 and a make contact 61. Make contact 61 is connected through resistor 62 to a terminal for connection as a source of ringing current 63.

When ringing relay 50 is engergized, break contact 60 opens and moving pole contact 59 contacts make contact 61, which applies ringing current to the tip and ring terminal 64 for application to the ringer of the local subscribers telephone set connected to terminals 64 and 65. Once ringing has been tripped by the subscriber going off-hook, ringing relay 50 is caused to open, causing moving contact 59 to contact break contact 60, and thus stopping ringing current from being applied to terminal 64 and the subscriber's telephone set, and re-establishing the circuit from the telephone set to the line circuit.

It will be noted that when the ringing relay has operated, the subscriber's line becomes unbalanced, and ringing signals as well as an altered DC level pass through and appear at the output of differential amplifier 10. Both the ringing and DC signal are applied through resistor 66 to a low pass active filter 67 of well known construction. Active filter 67 is fabricated so as to block the 20 Hz ringing signals, but to pass signals of lower frequency, including the DC off-hook signal level from the output of operational amplifier 10. It is also preferred that active filter 67 should pass 10 Hz signals, the frequency of rotary dial pulses, although this is not essential for the present circuit.

The output of low pass active filter 67 is connected to the noninverting input of differential amplifier 68, the output of which is connected through resistor 69 and diode 70 to the noninverting input of differential amplifier 71. The output of diode 70 is connected to ground through an integrating filter circuit comprising capacitor 72 in parallel with resistor 73 connected to a negative source of potential. The inverting input of differential amplifier 71 is connected to ground, and the inverting input of differential amplifier 68 is connected to a source off-hook bias via an OFHK BIAS lead. The DC level of this lead sets the sensitivity of the circuit for sensing the DC off-hook level from the output of differential amplifier 10.

In operation, the DC potential level output of differential operational amplifier 10 is applied through resistor 66 to low pass active filter 67. Here all signals below ringing frequency are passed through the filter, and ringing signals are rejected or greatly attenuated. The resulting DC level is applied to differential amplifier 68, which provides an output signal once the DC level is higher than the potential level on the off-hook bias lead. This signal is rectified and filtered to DC in diode 70, capacitor 72 and resistor 73, the resulting DC signal being applied to the input of differential amplifier 71.

When an off-hook condition exists, the output of differential amplifier 71 provides a high potential level, causing diode 56 to become forward biased, and cutting off operation of transistor 52. As described earlier with respect to a high level signal on the OFHK lead, ringing relay 50 is caused to open, removing ringing signals which had been applied to the subscribers line.

In the meantime a signal on the RING ACTUATE lead had been removed, and the +V potential, applied through resistor 53 and 54 are operative to cause the emitter-base junction of transistor 52 to be reverse biased, thus holding ringing relay 50 inoperative.

Switch 15, which preferably is a CMOS switch also is operated by a signal on the RING ACTUATE lead. Accordingly when ringing is applied to the subscriber's line upon the actuation of ringing relay 50, switch 15 is caused to open. Ringing signals thus appearing at the output of differential amplifier 10 are stopped from being applied to the output line via output line terminal 19, as well as from returning through amplifier circuit 34.

It should be noted that with the conduction of diode 56, light emitting diode 57 also conducts and eliminates, providing an indication that the subscriber has gone off-hook. A serviceman at the PBX examining the line circuit printed circuit boards thus can obtain an indication of which subscriber's lines are busy and which have remained on hook.

As noted earlier, the present line circuit can be used as a standardized circuit for interfacing with standard telephone sets. Two circuits connected with adjoining output terminals provide a two wire to one wire two way amplifier conversion. Each circuit converts a balanced tip and ring pair to a single wire unbalanced circuit, whereby single wire switching can be used. The circuit also contains provision for externally controlled gain increase for conferencing or the like.

As one of the important elements of the invention, a novel amplifier has been used which amplifies two different signals with different amounts of gain.

The circuit also provides means for applying ringing signal to subscribers telephone set, and for detecting a subsequent off-hook condition when the subscriber has answered the telephone, and for ring tripping. Facility is also provided for externally tripping the ringing, as might be provided, for instance, by an external timing circuit.

It will now become clear to a person skilled in the art understanding this invention that various variations and modifications could be made. All are considered within the scope of the present invention as defined in the appended claims.

The embodiments of the invention in which exclusive property or priviledge is claimed are defined as follows:

1. A telephone line circuit comprising
   (a) balanced tip and ring leads for connection to a telephone set, and an unbalanced line output lead,
   (b) first differential amplifier means having its input terminals connected through individual equal valued resistor means to the tip and ring leads, the values of each of the resistor means being at least 10 times the offhook impedance of the telephone set,
   (c) a buffer amplifier having its input connected by a first circuit path to the output of the first differential amplifier means and its output connected by a second circuit path to the line output lead,
   (d) second differential amplifier means having its input terminals connected respectively by circuit paths to said first and second circuit paths,
   (e) the output of the second differential amplifier means being connected to one of the tip or ring leads,
   (f) the output of the second differential amplifier means also being connected by a further resistor means to the input of the first differential amplifier means which is connected to the other of the tip or ring leads,
   (g) the value of the further resistor means being selected to apply sufficient output signal from the second differential amplifier means to the input of the first differential amplifier means which is connected to said other of the tip or ring leads such as to substantially cancel a signal within the first differential amplifier means which is applied to its input terminals via said one of the tip or ring leads from the output of the second differential amplifier means.

2. A telephone line circuit as defined in claim 1 in which the first differential amplifier means has a gain of less than unity, the buffer amplifier has gain of about the reciprocal of the gain of the first differential amplifier means, and the second differential amplifier means is comprised of amplifying means having gain which is different for different signals applied to each of its inputs from the first circuit path and from the second circuit path, respectively, the gains being selected so as to translate the individual signals applied from the output of the first differential amplifier means to each of the inputs of the second differential amplifier means to amplitude levels which are substantially equal whereby they substantially cancel within the second differential amplifier means.

3. A telephone line circuit as defined in claim 2 further including means for selectively increasing the gain of the buffer amplifier so as to increase the level of an output signal applied to the line output lead.

4. A telephone line circuit as defined in claim 3 further including a resistor means connected in series with the output of the buffer amplifier to the second circuit path, having a value similar to the line output impedance.

5. A telephone line circuit as defined in claim 1, 3 or 4, in which the output of the second differential amplifier means is connected to one pole of a source of current and to said one of the tip or ring leads through a first matching resistor means having value of about ½ the off hook impedance of the telephone set, the opposite pole of the current supply being connected through a second matching resistor means of similar value as the first matching resistor means to the other of the tip or ring leads.

6. A telephone line circuit as defined in claim 1, 3 or 4, in which the output of the second differential amplifier means is connected to one pole of a source of current, and to said one of the tip or ring leads through first matching resistor means having value of about ½ the offhook impedance of the telephone set, the opposite pole of the current supply being connected through a second matching resistor means of similar value as the first matching resistor means to the other of the tip or ring leads; further including a tip terminal, a ringing relay comprising an operate signal input lead, and a set of single pole double throw contacts, the pole of the contacts being connected to the tip terminal, a break contact being connected to the tip lead and a make contact being connected to means for connection to a source of ringing current; a switch means connected in series between the output of the first differential amplifier means and the first circuit path, having an enable input for causing operation of the switch means and opening of the first circuit path, the enable input being connected to the operate signal input lead of the ringing relay, whereby upon reception of a ring operate signal on said operate signal input lead, the ringing relay is caused to operate, causing the pole of its contacts to break the current path to the tip lead and to connect it to the means for connection to the source of ringing current, and said switch is caused to open said first circuit path.

7. A telephone line circuit as defined in claim 4, in which the output of the second differential amplifier means is connected to one pole of a source of a current supply and to said one of the tip or ring leads through a first matching resistor means having value of about ½ the off hook impedance of the telephone set, the opposite pole of the current supply being connected through a second matching resistor means of similar value as the first matching resistor means to the other of the tip or ring leads; and means for sensing the off hook condition of a telephone station set connected to the ring lead and to the tip terminal and for applying an inhibiting signal to the operate signal input lead of the ringing relay for causing release of said relay and of said switch means upon sensing of the off hook condition.

8. A telephone line circuit as defined in claim 7, in which the means for sensing is connected to the output of the first differential amplifier means, and includes a low pass filter adapted to block ringing frequency signals but to pass lower frequency signals.

9. A telephone line circuit as defined in claim 1, in which the output of the second differential amplifier means is connected to one pole of a source of current supply and to said one of the tip or ring lead through a first matching resistor means having value of about ½ the off hook impedance of the telephone set, the opposite pole of the current supply being connected through a second matching resistor means of the same value as the first matching resistor means to the other of the tip or ring leads, and further including a gate having an output connected to means for operating a ringing relay, an enable input to the gate for causing operation of the ringing relay, and a D.C. potential level sensing means having an input connected to the output of the first differential amplifier means and an output connected to an inhibit input of the gate for causing release of the ringing relay upon sensing of a predeterminal level of said D.C. potential at the output of said first differential amplifier means caused by the conduction of current from the current supply through an external telephone set from the ring to the tip leads.

10. A telephone line circuit as defined in claim 9 further including means for selectively varying the threshold of sensing of said D.C. potential level.

11. A telephone line circuit as defined in claim 10 in which the potential level sensing means is comprised of a low pass filter having a passband lower than ringing current frequency.

12. A telephone line circuit comprising:
(a) balanced tip and ring leads for connection to a telephone set, and an unbalanced line output lead,
(b) first differential amplifier means having its input terminals connected through individual equal valued resistor means to the tip and ring leads, the values of each of the resistor means being large relative to the offhook impedance of the telephone set,
(c) the output of the first differential amplifier means being connected by a circuit path to said line output lead, for applying outgoing signals thereto,
(d) second amplifier means having its input connected by a circuit path to the line output lead for receiving incoming signals,
(e) the output of the second amplifier means being connected to one of the tip or ring leads to which one input of the first differential amplifier is connected,
(f) the output of the second amplifier means also being connected by a further resistor means to the other input of the first differential amplifier means,
(g) the value of the further resistor means being selected to apply sufficient output signal from the second amplifier means to said other input of the first differential amplifier means so as to substantially cancel a signal within the first differential amplifier means which is applied to its said one input terminal via said one of the tip or ring leads from the output of the second amplifier means.

13. An amplifier circuit comprising means for amplifying two different signals with different gain comprising:
(a) a differential operational amplifier having an inverting and noninverting input, and an output,
(b) a feedback resistor (R1) connected between the output and the inverting input,
(c) a first signal source having its output connected to the noninverting input,
(d) a buffer amplifier having its input connected to the first signal source,
(e) a second signal source having its output connected to the output of the buffer amplifier and through an input resistor (R2) to the inverting input of the amplifier, and
(f) a bypass resistor (R3) connected from said inverting input to ground, whereby the gain provided by said amplifier circuit to a signal from the first signal source is given by the expression $$R1 / \frac{(R2)(R3)}{(R2)+(R3)}$$

and the gain provided by said amplifier circuit to a signal from the second signal source is given by the expression R1/R2, where R1, R2, and R3 are resistance values in ohms.

* * * * *